United States Patent
Ackerman et al.

(10) Patent No.: US 6,384,947 B1
(45) Date of Patent: *May 7, 2002

(54) TWO PATH DIGITAL WAVELENGTH STABILIZATION

(75) Inventors: David Alan Ackerman, Hopewell, NJ (US); Scott L. Broutin, Kutztown, PA (US); James Kevin Plourde, Allentown, PA (US); George John Przybylek, Douglassville, PA (US); John William Stayt, Jr., Schnecksville, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/265,291

(22) Filed: Mar. 9, 1999

(51) Int. Cl.[7] .................... H04B 10/00; H04B 10/08; H04B 10/10
(52) U.S. Cl. .................... 359/187; 359/127; 359/132
(58) Field of Search ................ 359/127, 132, 359/187; 372/32, 28

(56) References Cited

U.S. PATENT DOCUMENTS

| | | | | |
|---|---|---|---|---|
| 5,825,792 A | * | 10/1998 | Villeneuve | 372/32 |
| 6,094,446 A | * | 7/2000 | Tei | 372/32 |
| 6,101,200 A | * | 8/2000 | Burbidge | 372/29 |
| 6,122,301 A | * | 9/2000 | Tei | 372/32 |
| 6,144,025 A | * | 11/2000 | Tei | 250/226 |
| 6,198,757 B1 | * | 3/2001 | Broutin | 372/32 |

FOREIGN PATENT DOCUMENTS

| | | | | |
|---|---|---|---|---|
| JP | 10253452 A | * | 9/1998 | 372/32 |
| WO | WO9705679 | | 2/1997 | H01S/3/13 |

OTHER PUBLICATIONS

Santec Product Catalog, OWL–12/20.*
Santec Technical Note—Optical Wavelength Locker/Monitor OWL–10.
B. Villaneuve, H.B. Kim, M. Cyr, and D. Gariepy—A Compact Wavelength Stabilizatin Scheme for Telecommunication Transmittors.

* cited by examiner

Primary Examiner—Jason Chan
Assistant Examiner—Agustin Bello
(74) Attorney, Agent, or Firm—Synnestvedt & Lechner LLP

(57) ABSTRACT

A method and apparatus for stabilizing the wavelength of a laser are disclosed. The invention provides a way to stabilize a laser for applications in dense wavelength division multiplexing (DWDM) systems where frequency spacing is crucial. The invention accomplishes laser stabilization by generating an optical path which is passed through a filter to obtain a signal which is a function of frequency. A second optical path which does not contain a filter is generated to obtain a signal which is a function of power. The signals are then converted from optical to electrical and from analog to digital, and a microcontroller is used to normalize the frequency path with respect to the optical power path, process the signals via software code, and generate a signal which provides feedback to the laser for stabilization. By using a microcontroller; elements that lead to wavelength or frequency drift, or manufacturing component variations can be taken into account and the input signal to the laser can be adjusted accordingly.

23 Claims, 4 Drawing Sheets

TWO PATH DIGITAL WAVELENGTH STABILIZATION

FIELD OF THE INVENTION

The present invention relates to a novel and useful method for stabilizing the wavelength of a laser source.

BACKGROUND OF THE INVENTION

Laser sources are widely used in wavelength division multiplexed systems. In wavelength division multiplexed systems, it is important that the wavelength used is very stable. Although lasers are inherently very stable, increased stabilization of a laser's wavelength becomes crucial as systems migrate to dense wavelength division multiplexing (DWDM) types. In DWDM systems, many wavelengths are placed on a single fiber to increase system capacity. Currently the spacing in DWDM systems between frequencies is around 100 GHz and can be handled by traditional laser stabilization methods. However, as technology moves toward frequency spacings of 25–50 GHz or less, increased stabilization will be required to prevent interference between wavelengths as the spacings become closer and closer.

Presently, to wavelength stabilize lasers, the wavelength or equivalently the optical frequency of a laser is compared to a stable reference element. One method is to use an optical filter as a reference element. The output of the laser is split and part of the beam is passed through an optical filter to create an optical signal which is a function of wavelength or frequency and optical power (hereinafter "the optical filtered path"). The optical filtered path is then processed, assuming that a change in signal amplitude corresponds to a change in frequency, and a signal is generated which is fed back to the laser to stabilize the laser's wavelength. However, a change in signal amplitude at the output of the filter could be the result of a change in the power output of the laser rather than a change in the laser's frequency.

Another method of stabilizing a laser is to pass a slightly diverging beam of light, obtained by splitting the output of the laser source, through a filter at different angles of inclination as shown in FIG. 1. The two photo-detectors, $P_1$ and $P_2$, act as apertures and capture a different portion of the light emitted by the divergent source. This produces two different spectral responses, offset in wavelength according to their angular difference with respect to the filter. Since $P_1$ captures a portion of the emitted light which passed through the filter at a higher tilt angle than that captured by $P_2$, it's response will peak at a slightly lower wavelength than $P_2$ as depicted in FIG. 2. The filter and alignment parameter are chosen so that the wavelength offset between the two responses is roughly equal to their effective bandwidths. The signals are then compared differentially to generate a signal which can be used to stabilize the wavelength of the laser by maintaining $\lambda = \lambda_0$, as further depicted in FIG. 2.

In a stabilized system, wavelength or frequency drift can be introduced by the aging or temperature dependence of the laser itself, or by the aging or temperature dependence of the optical reference filter, the optical detectors, or the stabilization electronics. In addition, manufacturing variations of system components can result in varying wavelengths from system to system. Existing systems are unable to adequately compensate for the multitude of variables that can arise in a stabilization system when a very high level of stabilization is needed.

SUMMARY OF THE INVENTION

The present invention provides an improved method for stabilizing the wavelength of a laser source. The invention accomplishes this objective by using an optical filter, dual optical paths, analog and digital conversion, and a microcontroller.

In a preferred embodiment of the present invention, wavelength stabilization of a laser is accomplished via a laser, optical couplers, an optical filter, optical detectors, current-to-voltage converters, amplifiers, analog-to-digital converters, a microcontroller, and a digital-to-analog converter.

In the present invention, a laser generates a signal which is carried by a fiber optic cable. Two separate paths are created from the fiber optic cable via photo-couplers. The first path is an optical filtered path which passes through an optical filter. The second path is a power reference path used for normalization. Since the optical filtered path contains an optical filter, it provides a signal the power of which is a function of wavelength as well as the optical power output of the laser. The power reference path is unfiltered so as to provide a signal the power of which is a function only of the optical power output of the laser. A change in the output power of the optical filtered path should primarily indicate a frequency change of the laser. However, the change may be due to a change in the optical power of the laser. By normalizing the optical filtered path to the power reference path, the change in power in the optical filtered path that is due to frequency change rather than laser output power change can be isolated and used to stabilize the frequency of the laser source.

The other components are used to provide electrical signals, convert the signals into a usable form, and manipulate the signals. Optical detectors are used to convert the optical signals from the optical filtered path and the power reference path to electrical signals. The electrical signals produced by the detectors are then converted from current to voltage, via current-to-voltage converters. The current-to-voltage converters may provide some pre-amplification to the signal or pre-amplification may be provided by other means. Next, the signals from the converters are amplified, via amplifiers, to provide gain and prepare them for analog to digital conversion. The amplified signals are then converted from analog to digital by analog-to-digital converters to prepare them for processing by a microcontroller. The microcontroller then processes the signals in any manner desired using software code and generates an appropriate signal which is converted from digital to analog by a digital-to-analog converter for use in adjusting the laser's frequency. The microcontroller's processing can be accomplished by any of the following types of apparatus: microprocessor, processor, digital signal processor, computer, state machine, or essentially any digital processing circuit.

The present invention adds greater flexibility to wavelength stabilization systems. For example, long integration times, which are impractical via traditional stabilization means because of unrealizable component values and physical size restrictions, level shifting or stabilization on either/or both positive and negative slopes, and accommodation of manufacturing variations in the optical filter, are all possible utilizing the present invention.

DETAILED DESCRIPTION OF THE INVENTION

Figure 1:
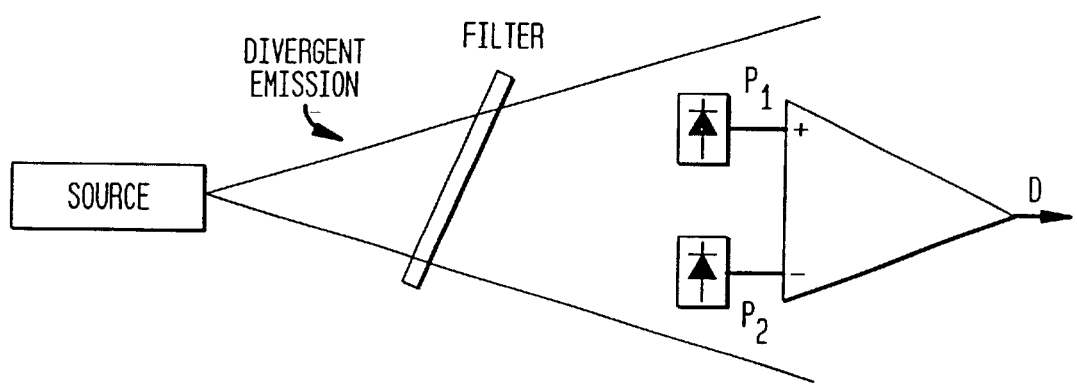
FIG. 1 is a block diagram of a two-path wavelength stabilization system in accordance with the prior art.
Figure 2:
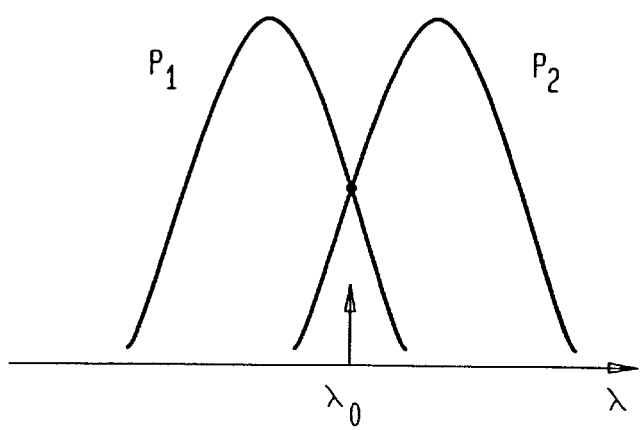
FIG. 2 is a graph depicting signal amplitude vs. wavelength of the signals at the photo-detectors, $P_1$ and $P_2$, in the circuit of FIG. 1.
Figure 3:
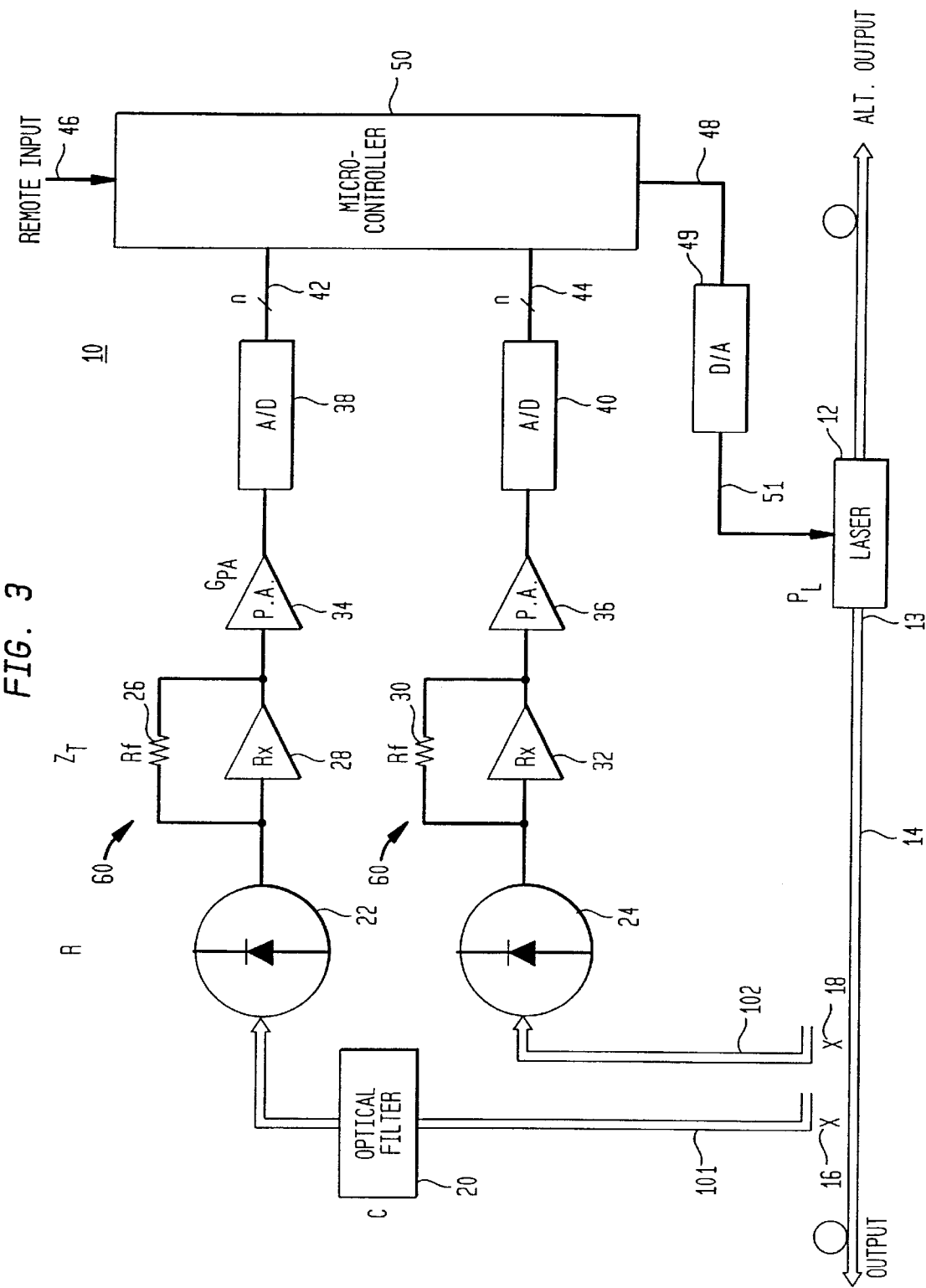
FIG. 3 is a block diagram of a two-path wavelength stabilization system in accordance with the present invention.

Referring more specifically to the drawings, in FIG. 3, a two path wavelength stabilization system 10 in accordance with the present invention is depicted. FIG. 3 illustrates the components of the present invention which include: a laser source 12, an optical fiber 14, photo couplers 16 and 18, an optical filter 20, photo detectors 22 and 24, current-to-voltage converters 28 and 32, amplifiers 34 and 36, analog-to-digital converters 38 and 40, microcontroller 50, and digital-to-analog converter 49. The components connected together, as depicted in FIG. 3, provide increased stabilization for a laser to be used in dense wavelength division multiplexing (DWDM) systems or similar systems where very stable laser frequencies are required. The output 13 from either the front face or the back face of the laser 12 produces a signal having a power $P_L$ which is placed on the fiber optic cable 14. The initial signal on the fiber optic cable is then used to create two independent paths, the optical filtered path 101 and the power reference path 102. The optical filtered path 101 and the power reference path 102 are created by placing photo-couplers 16 and 18, respectively, on the fiber optic cable 14 carrying the signal from the laser 12. The optical filtered path 101 is passed through an optical filter 20 to obtain a signal which is, at least partially, a function of wavelength or frequency, and becomes a reference element for frequency stabilization. The power reference path 102 does not pass through the optical filter 20 and provides a signal which is a function solely of the laser's optical power $P_L$, and is eventually used for normalizing the optical filtered path 101.

The optical filtered path 101 and the power reference path 102 are then processed to provide suitable signals for the microcontroller 50. Separately, each path passes through a photo-detector 22 or 24, current-to-voltage converter 28 or 32, amplifier 34 or 36, and analog-to-digital converter 38 or 40.

The photo-detectors 22 and 24, transform the optical signal from each path into an electrical signal which is required as an input for electrical circuits. The photo-detectors 22 and 24 produce an electrical current which is a function of the optical signal strength. The conversion or responsivity of the photo-detectors 22 and 24 is, for example, roughly 1 ampere of electrical current for each watt of optical power. Assuming the optical power into the photo-detectors 22 and 24 is 1 µW, the initial electric current out of the photo-detectors 22 and 24 is in the neighborhood of 1 µA.

Figure 4:
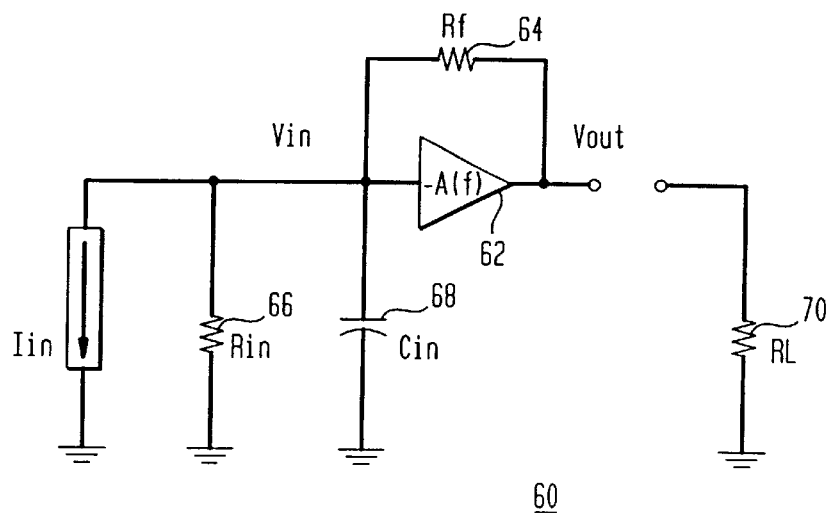
FIG. 4 is a circuit diagram of an exemplary pre-amplifier and current-to-voltage converter for use in the circuit of FIG. 3.

The current-to-voltage converters 28 and 32, convert the output of the photo-detectors 22 and 24 from a signal represented by a current to one represented by a voltage and provide some pre-amplification. The conversion of the signal from current to voltage and the signal's pre-amplification is combined as depicted in FIG. 4. In FIG. 4, a current signal, $i_{in}$, is amplified and transformed into a voltage signal, $v_{out}$. The amplification and current to voltage transformation is accomplished by a transimpedance amplifier 60 created by using an inverting amplifier 62 with resistor 64 in a feedback loop. If a 100 kΩ resistor is used for feedback resistor 64, the output voltage $v_{out}$ will be approximately the input current $10^{-6}$ A times the feedback resistance 100 kΩ, or about 0.1 V.

Figure 5:
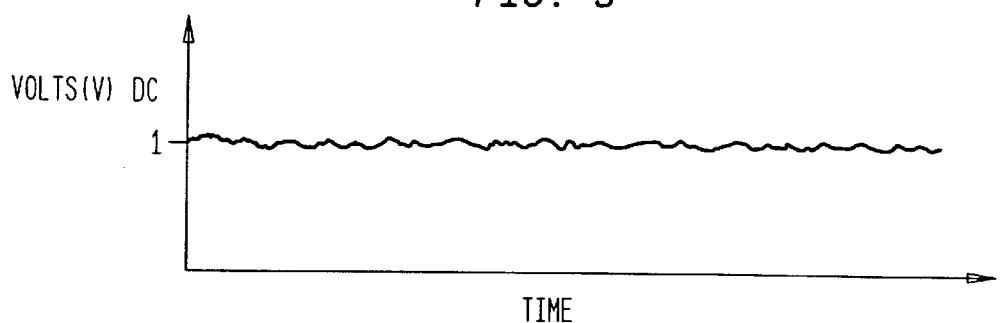
FIG. 5 is a graph of the voltage level in the optical filtered path prior to analog to digital conversion in accordance with the present invention.
Figure 6:
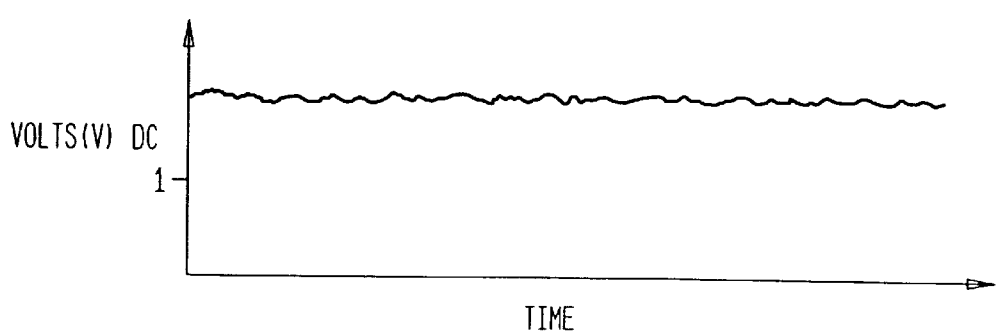
FIG. 6 is a graph of the voltage level in the power reference path prior to analog to digital conversion in accordance with the present invention.

The amplifiers 34 and 36, provide additional gain to the signal to condition the signal for the analog-to-digital converters 38 and 40. If the amplifiers 34 and 36 provide a gain of 10, the signals will be approximately 1 V as they enter the analog-to-digital converters. FIGS. 5 and 6 depict the signals on the optical filtered path and the power reference path, respectively, prior to entering the analog-to-digital converters 38 and 40. As can be seen in the figures, at this point, the signals are DC voltages carrying some noise with the voltage of the optically filtered path 101 slightly lower than the voltage of the unfiltered path 102. This example assumes that the components in the two paths are matched (which, of course, is not a requirement).

The analog-to-digital converters 38 and 40 convert the input analog signals to digital signals. The resultant digital signals 42 and 44 are in a form which can be processed and manipulated by the microcontroller 50.

The digital signals 42 and 44 are then processed by the microcontroller 50, which produces the output signal 48. The microcontroller 50 numerically divides the optical filtered path digital signal 42 by the power reference path digital signal 44 to normalize the optical filtered path digital signal 42, whereby a digital value which is a function solely of the lasers wavelength is derived. The microcontroller can then use the digital value representing the laser's wavelength to generate signal 48. Signal 48 is then converted from digital to analog by digital-to-analog converter 49 to produce a laser adjustment signal 51 which can be used for adjusting the wavelength of the laser 12. The processing by microcontroller 50 can be accomplished by any of the following types of apparatus: microprocessor, processor, digital signal processor, computer, state machine, or essentially any digital processing circuit.

The signal 51 can be in any form desired for controlling the frequency of the laser 12 and can be modified by changes in the microcontroller's software code via remote input 46. The signal 51 generated through the digital-to-analog converter 49 by the microcontroller 50 may be a current for adjusting the temperature of a thermoelectric cooler on which the laser 12 is mounted, or the microcontroller 50 may generate other appropriate signals either with or without digital to analog conversion depending on the method used to modify the frequency of the laser 12.

The present invention can use this two path digital wavelength stabilization method to achieve a level of wavelength stabilization that is impractical or impossible via analog means. For example, improved stabilization can be achieved by identifying small variations in the laser's wavelength. Small wavelength variations can be masked by noise in the laser 12 and stabilization circuitry 10. In order to increase the signal to noise ratio, the normalized signal can be integrated over a period of time, with improved signal to noise ratios resulting from longer integration periods. Traditional analog systems are constrained by an RC (resistance and capacitance) time constant. In order to obtain long integration times, such as a month, a capacitor the size of a trash can would be required. By using microcontroller 50, the signals can be sampled over a period of minutes, days, months, or even years, depending on the amount of time required to obtain a desirable signal to noise ratio. The microcontroller can accomplish long integration times by storing signal values in memory or keeping a running total of averages digitally.

Additionally, the digital approach to wavelength stabilization allows for flexibility in choosing system components. Different types of filters with varying characteristics can be used for optical filter 20 by modifying software in the microcontroller 50, without changing other system components. This allows for using inexpensive filters or incorporating new filter designs into stabilization circuit 10. Also, photo-detectors 22 and 24, current-to-voltage converters 28 and 32, and amplifiers 34 and 35 can be chosen based on availability or cost with variations in their respective signal levels accommodated by software in the microcontroller 50. For example, if the optical filtered path digital signal 42 was twice as big as the power reference path digital signal 44, due to mismatched components, the microcontroller 50 could divide the optical filtered path 42 by two or multiply the power reference path 44 by two. Attempting system modifications such as this, although readily achievable with a microcontroller, would require almost completely redesigning a circuit to accomplish in an analog system.

Further, this method of wavelength stabilization allows for the use of components with high levels of manufacturing variations, permitting the use of less expensive components. Variations in system components can be accommodated by changing software code in the microcontroller 50, either at the factory when the laser's frequency is originally set, or via remote input 46 at a later date. The microcontroller 50 software can numerically account for amplifier component variations resulting in digital signal levels that are too high or too low, filters with varying wavelength characteristics, and other types of system variations. Attempting similar flexibility in an analog system would require exhaustive design considerations.

The wavelength stabilization system 10 according to the present invention offers vast improvements over traditional stabilization systems. As stated above, long integration times, which were previously impractical because of unrealizable component values, flexibility in choosing system components, and accommodation of manufacturing variations in the optical filter 20 and other components in the circuit 10, are all easily achievable utilizing the digital stabilization system 10. The flexibility gained by using the new stabilization system 10 is due to the ability to program the microcontroller 50 to perform many different functions on the digital inputs 42 and 44 with software using mathematical equations, versus attempting to use analog circuit components to accomplish the same type of functions in an analog system. In addition, the remote input 46 can be used to modify software code in the microcontroller 50. For example, various control algorithms or normalization methods can be used or changed at will via code changes in the microcontroller 50 via remote input 46.

Support for Digital Stabilization and Optical Filter Selection

The invention relates to a two path digital optical wavelength stabilization method which uses a microcontroller. The required optical filter selectivity which depends on the signal to noise ratio and unwanted amplitude drift is considered. This digital method where the wavelength set points are set numerically has many advantages, including:

- manufacturing variations in the optical filter are easily accommodated;
- remote accessibility and field reprogrammability;
- highly flexible functional approach;
- accommodation of various frequency grids via software;
- quick response to customer changes via software;
- easy interface with other digital components; and
- performance not limited by practical analog component values, e.g. digital integration.

In the following sections, the required optical frequency stability is given as $\Delta f_s$. For any optical channel i, the overall noise is assumed to have a Gaussian distribution with an equivalent standard deviation $\sigma_f$ (rms noise) and a mean value, $\Delta f = f - f_{chi}$. If $\sigma_f << \Delta f_s$, the entire $\Delta f_s$ can be assigned to aging, defined as $\Delta f$. Otherwise, $\Delta f_s$, must be divided between noise and aging.

I. Calculation Of Signal To Noise Ratio i. Noise Current from Noise Voltage

Before the overall signal to noise ratio can be calculated, several intermediate terms are calculated. The series input noise current as a function of the shunt noise voltage of the pre-amplifier 60 is calculated here in order to place all values in the form of an equivalent noise current. The input noise voltage is usually found in the product data sheet for the particular pre-amplifier chosen. An exemplary pre-amplifier 60 circuit is shown in FIG. 4.

The rms input noise current squared is given by $$i_{in}^2 = \int_0^\infty v_{in}^2 |Y_{in}|^2 df \tag{1}$$

where $v_{in}$ is the input noise voltage and $Y_{in}$ is the admittance at the input node. At the input node $$i_{in} + \frac{v_o - v_{in}}{R_F} - j\omega C v_{in} - \frac{v_{in}}{R_{in}} = 0 \tag{2}$$

And using $$v_o = -A(f)v_{in} \approx -Av_{in} \tag{3}$$

where $$A(f) = \frac{A e^{-j(\omega t - \chi)}}{i + \dfrac{jf}{f_{ref}}} \simeq A \tag{4}$$

gives $$i_{in} = \frac{A+1}{R_f} v_{in} - j\omega C v_{in} - \frac{v_{in}}{R_{in}} = 0 \tag{5}$$

Therefore $$Y_{in} = \frac{A+1}{R_F} + j\omega C + \frac{1}{R_{in}} \tag{6}$$

and

-continued $$|Y_{in}|^2 = \left(\frac{A}{R_F} + \frac{1}{R_F} + \frac{1}{R_{in}}\right)^2 + (\omega C_{in})^2 \quad (7)$$

This gives $$i_{in}^2 = \int_0^\infty v_{in}^2 \left\{\left(\frac{A}{R_F} + \frac{1}{R_F} + \frac{1}{R_{in}}\right)^2 + (\omega C)^2\right\} df \quad (8)$$

Since the noise bandwidth (hereinafter BW) is limited, we can integrate over zero to BW rather than 0 to ∞. Also, a graph of $v_{in}^2$ is given in a typical pre-amplifier data sheet. One potential pre-amplifier that can be used in accordance with the present invention is the LMC 660 manufactured by the National Semiconductor Corp. of Santa Clara, Calif., USA. For the frequency range of interest here, the noise voltage curve shown in the data sheets for the LMC 660 is found to be approximated by $$v_{in}(f) \cong V_A/f^{0.35} \quad (9)$$

where the noise voltage at 1 Hz is $V_A$=200 nV/√Hz, f is dimensionless, i.e. $f/f_0$, where $f_0$=1 Hz, and the preamplifier gain is A≅$10^4$ for $R_L$=2 kΩ.

This gives $$i_{in}^2 \cong V^2 \left\{\left(\frac{A}{R_F} + \frac{1}{R_F} + \frac{1}{R_{in}}\right)^2 \frac{BW^{0.3}}{0.3} + (2\prod C_{in})^2 \frac{BW^{2.3}}{2.3}\right\} \quad (10)$$

Only the last term, the capacitance term, is usually shown in a typical receiver noise analysis, but for the condition of long integration times or low noise bandwidth, the first term, the $A/R_F$ term, dominates.

ii. Quantization Noise of Analog-to-Digital Converter

The analog-to-digital (A/D) converter quantization noise is addressed here following the analysis of J. G. Proakis and D. G. Manolakis, Digital Signal Processing pg 412, Macmillan Publishing Company ISBN 0-02-396815-X, incorporated herein by reference. A number of assumptions regarding the nature of the quantization noise are made, i.e. uncorrelated, uniformly distributed, stationary white noise, etc. The signal to quantization noise ratio is given as $$\frac{S}{N} = 10\log\frac{Psig}{Pnoise} = 6.02b + 16.81 - 20\log\frac{R}{\sigma_{sig}} \text{ (dB)} \quad (11)$$

where Psig is the signal power, Pnoise is the noise power, b is the number of bits, R is the range setting, and $\sigma_{sig}$ is the rms signal amplitude. The overload noise or clipping is set to be negligible by way of the chosen range value and is ignored. An analog-to-digital converter is selected with an adequate number of bits sufficient to make the quantization noise trivial. This is verified in the spreadsheet described in the following section.

iii. Overall Signal to Noise Ratio

The overall signal to noise ratio seen by the microcontroller is calculated in this section. The remaining terms beyond those discussed above are well known. Table 1 describes the various noise terms referenced to the equivalent noise current at the detector output.

TABLE 1

Noise Terms

| Term | Units | |
|---|---|---|
| BW | Hz | Noise Band Width |
| $R_f$ | Ohms | Feedback Resistance |
| $R_{IN}$ | Ohms | Resistance at Input Node |
| $C_{IN}$ | F | Capacitance at Input Node |
| b | | Number of Effective Bits in A/D Converter |
| R | V | Range Setting of A/D Converter |
| R/σ | | Range to Noise Ratio at A/D Converter Input |
| IC Noise Current | pA/√Hz | LMC 660 Data Sheet ~2E-4 |
| Noise Voltage | V/√Hz | LMC 660 Data Sheet, Obtain ~2E-7/f^0.35 |
| Noise Current From Noise Voltage | $A^2$ | (2E-7){(A/Rf + 1/Rf + 1/Ri)$^2$*BW^0.3/0.3 + (2*II*C)$^2$*BW^2.3/2.3} |
| Thermal Noise Current | A2 | 4*k*T*BW/Rf |
| Shot Noise Current | A2 | 4*e*I*BW |
| Laser RIN | A2 | BW*I^2*RIN |
| Quantization S/N | dB | 6.02*b + 16.81 − 20*LOG(R/σ) |

Table 2 is a spreadsheet for calculating the overall signal to noise ratio seen by the microcontroller 50.

TABLE 2

Noise Analysis

| NOISE ANALYSIS | Units | |
|---|---|---|
| Preamp Shunt Noise Voltage Calculated from Data Sheet of Assumed Device | V/√Hz | 2.000E−07 |
| Preamp Feedback Rx Value | Ohms | 1.000E+05 |
| Effective Post Amp Gain Front End Output to A/D Input | Linear | 10 |
| Effective Electronic BW | Hz | 1.000E+02 |
| Numerical Sampling Frequency = 2*electronic BW | Sec | 2.000E+02 |
| Numerical Averaging Time | Sec | 1.2000E+02 |
| Effective Numerical Noise BW (BW ~1/T) | Hz | 8.333E−03 |
| Effective Overall Noise BW, Electronic & Numerical | Hz | 8.333E−03 |
| Temp | ° C. | 25 |
| Temp | ° K. | 2.980E+02 |
| Total Capacitance at Input Node | F | 1.000E−11 |
| Assumed Optical Path Conditions | | |
| Assumed CW Laser Power at Optical Feedback Circuit | dBm | −16.0 |
| Assumed Optical Path (Loss), Fiber/Coupler/Filter | dB | −13.0 |
| Received Average Optical Power | dBm | −29.0 |
| Equivalent Signal Current Assuming ETTA = 0.8 | A | 1.257E−06 |
| Equivalent Signal Current Squared | $A^2$ | 1.581E−12 |
| Calculate Total Elect Noise at Elect BW | | |
| Assumed Laser RIN Value | /Hz | 1.000E−14 |
| Post Amp Noise Figure Etc., Ignore | dB | 0.000E+00 |
| Post Amp Noise Figure Etc., Ignore | Linear | 1.000E+00 |
| Equivalent Preamp IC Noise Current Sq. at Input | $A^2$ | 4.000E−30 |
| Equivalent Preamp Noise Current Sq. from Noise Voltage | $A^2$ | 5.309E−15 |
| TH. RMS Noise Current Sq. at Detector | $A^2$ | 1.645E−23 |
| Shot Noise Current Sq. in Received Optical Signal | $A^2$ | 4.028E−23 |
| Laser Mean Sq. RIN Noise Current | $A^2$ | 1.581E−24 |
| Total Electronic Noise Current Sq. | $A^2$ | 5.309E−15 |
| S/N Power Ratio at Electrical BW, Signal Path Only | dB | 25 |

TABLE 2-continued

Noise Analysis

| NOISE ANALYSIS | Units | |
|---|---|---|
| Calculate A/D Overload (Verifies Proper A/D Range) | | |
| Set Value for A/D Range | V | 1.500E+00 |
| Electronic RMS Noise Voltage at A/D Input | V | 0.0729 |
| Electronic Signal Voltage/Noise Voltage at A/D Input | | 17.2558 |
| Ratio of A/D Range to Noise Sigma (Ignore Aging and Drift) | | 20.5863 |
| A/D Overload (# overload samples per # samples) | | 3.65E−94 |
| Total Noise Current at PIN at Total BW, Excluding A/D Quant Noise | | |
| Assumed Laser RIN Value | /Hz | 1.000E−14 |
| Ignore other Noise, Post Amp Noise Figure Etc. | dB | 0.000E+00 |
| Ignore other Noise, Post Amp Noise Figure Etc. | Linear | 1.000E+00 |
| Equivalent Preamp IC Noise Current Sq. at Input | $A^2$ | 3.333E−34 |
| Equivalent Preamp Noise Current Sq. from Noise Voltage | $A^2$ | 3.172E−16 |
| TH. RMS Noise Current Sq. at Detector | $A^2$ | 1.371E−27 |
| Shot Noise Current Sq. in Received Optical Signal | $A^2$ | 3.357E−27 |
| Laser Mean Sq. RIN Noise Current | $A^2$ | 1.317E−28 |
| Total Noise Current Sq. | $A^2$ | 3.172E−16 |
| S/N Power Ratio at Total BW | Linear | 4.985E+03 |
| S/N Power Ratio at Total BW A/D Effects Included Below | dB | 37 |
| Chosen Number of Bits of A/D Converter | | 10 |
| S/N of A/D Converter (Power Ratio) | dB | 75 |
| S/N of A/D Converter (Power Ratio) | Linear | 118534 |
| S/N Current Ratio Sq. after Digitization, Including A/D Converter | $A^2$ | 4783 |
| S/N Ratio After Digitization, Including A/D Converter | dB | 37 |

In practice only one or a few noise terms above dominate, but the various terms are included for completeness. They also serve as place holders to allow calculations over a wide range of future conditions. At present, the noise voltage dominates the other noise terms by a wide margin and is the place to focus attention should a reduction in noise be required beyond what can be achieved through averaging.

In Table 2, the received optical power available to the stabilization circuit at photodetectors 22 or 24 is (initially) assumed to be −29 dBm. Different time constants or noise bandwidths exist for the analog and digital signals. The time constant in the analog portion of the circuit is determined by component selection, and is limited by component availability. The digital time constant is bound by the available memory and the software code in the microcontroller 50. The analog and digital time constants are combined on a sum of squares basis to get an overall time constant, although in practice the digital bandwidth will be set to dominate the analog bandwidth by a wide margin.

To verify that a proper range setting of the analog signal was chosen to avoid overload or clipping in the analog-to-digital converter, the total analog noise current of the analog signal at the electronic noise bandwidth is first calculated. The total noise except for the quantization noise can then be calculated at the overall noise bandwidth. Next, the quantization noise of the analog-to-digital converter 38 or 40 can be included to obtain the total noise, both analog and digital. The overall signal to noise ratio is then calculated using the signal current determined from the optical power.

II. Filter Slope Versus Noise and Aging i. Introduction

Given a certain stability requirement and the optical filter selectivity, a signal to noise ratio can be determined to meet the stability specification. At the optical detector 22, the electrical signal current is given in the usual manner for the optical filtered path 101 by $$i_1 = P_L C_1 C(f) R \quad (12)$$

and at the analog-to-digital converter 38, the input signal voltage is given by $$V_{A/D_1} = P_L C_1 C(f) R R_T G \quad (13)$$

where $P_L$ is the optical output power 13 of the laser 12 into the control system, $C_1$ is the optical path loss which includes the optical coupler 16, C(f) is the optical filter 20 insertion loss, R is the detector 22 responsivity, $R_T$ is the feedback resistance 26 across the preamplifier 60, and G is the postamplifier 34 gain which includes all electrical path losses. For convenience, either C(λ) or C(f) can be used. Assume that the optical filter 20 response is given by $$C(f) \cong \frac{dC}{df} \Delta f + C_{chi} \quad (14)$$

where C(f) is the optical filter transmission response, dC/df is the filter 20 slope objective, Δf is the frequency difference from the desired value at channel i, and $C_{chi}$ is the filter 20 insertion loss for channel i.

The signal current or voltage is normalized with respect to optical power such that only C(f) is obtained, and not C(f, $P_L$). If the two paths are considered identical except for the optical filter, the signal current after normalization is given as $$\frac{i_1}{i_2} = \left\{ \frac{dC}{df} \Delta f + C_{chi} \right\} \quad (15)$$

For simplicity in the following analysis, path 102, the normalization path, will not be included and the noise is understood to be the noise after normalization.

ii. Required Signal to Noise Ratio

In this section, the maximum overall noise is determined assuming that the mean value of the optical frequency is constant (no aging) and the entire frequency stability specification can be allocated to the noise. As described earlier, the noise is assumed to be Gaussian with an equivalent optical standard deviation $\sigma_f$ and a mean value Δf. Thus, Δf is assumed to be zero (no aging) and the entire optical frequency specification is allocated to the standard deviation. Therefore, $$\frac{\Delta f_s}{\sigma_f} \geq \varepsilon \quad (16)$$

where $\Delta f_s$ is the optical frequency stability specification and ε is the specification that defines the number of standard deviations to which the frequency specification, $\Delta f_s$, applies, or equivalently the fraction of time that $\Delta f_s$ can be exceeded. For example, if ε=1, $\Delta f_s$, will be exceeded 32% of the time. Typically, ε is expected to range from 1 to 3.

This gives $$\sigma_{no} = \sigma_f |dC/df| \quad (17)$$

where $\sigma_{no}$ is the dimensionless allowable electrical standard deviation of the total noise distribution which in practice is dominated by the electrical noise (see Table 2). In (17), the allowable standard deviation as a function of frequency, $\sigma_f$, was translated into a corresponding normalized amplitude distribution via the optical filter slope. It is assumed that either $|dC/df|$ or $|dC/d\lambda|$ provides a stable operating point. Combining (16) and (17) gives $$\sigma_{n0} \leq (\Delta f_s/\epsilon)|dC/df| \tag{18}$$

Translating $\sigma_{n0}$ from dimensionless units to equivalent units of current, referenced to the photo-detector output gives the rms electrical noise $$\sigma_n = \sigma_{n0} P_L C_1 C_{chi} R \tag{19}$$

The signal to noise power ratio at channel 1 is given by $$S_1/N_1 = i_1^2/\sigma_n^2 = 1/\sigma_{n0}^2 \tag{20}$$

Combining (18) and (20) gives $$|dC/df| \geq \epsilon/\{f(\Delta f_s/f)(S_1/N_1)^{1/2}\}. \tag{21}$$

Or, in terms of the normalized optical wavelength $$(1/C_{chi})|dC/d\lambda| \geq \epsilon/\{C_{chi}\lambda(\Delta f_s/f)(S_1/N_1)^{1/2}\}). \tag{22}$$

Figure 7:
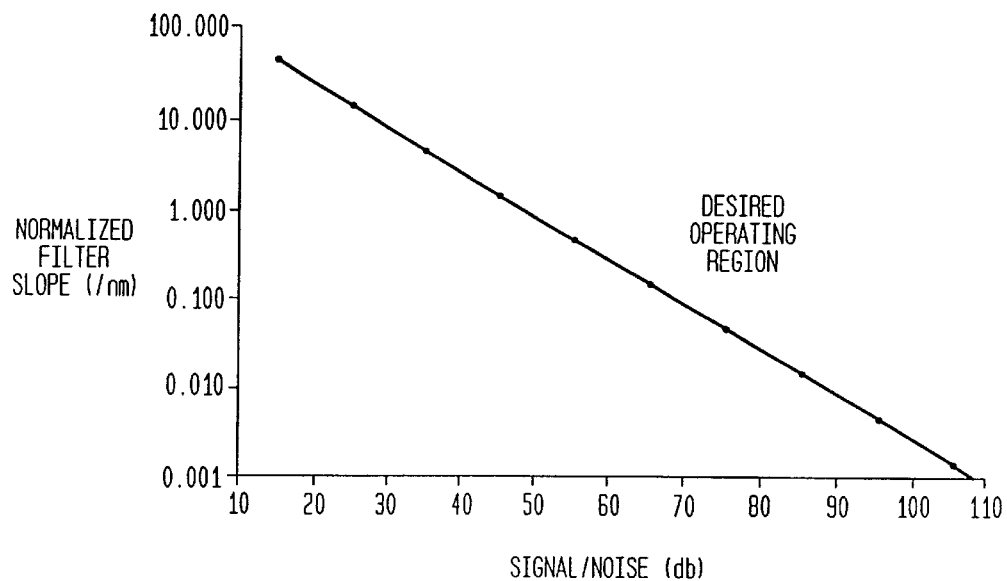
FIG. 7 is a graph depicting optical filter slope vs. signal-to-noise ratio of the overall circuit of FIG. 3.

Equation (22) gives the required normalized optical filter slope in terms of the frequency stability specification, ($\Delta f_s/f$), and the equivalent signal to noise ratio at the optical detector output under the assumption of zero drift. The signal to noise ratio may be the overall value which includes electronic noise. A plot of equation (22) is shown in FIG. 7 where $\epsilon$ is assumed to be 1.

iii. Aging

Aging, also called drift or amplitude change, is considered here. All aging is included as an equivalent optical filter change. The entire frequency stability specification is assigned to this effect and thus, noise is ignored. The optical filter transmission is given by $$C(f) = \left|\frac{dC}{df}\right| |\Delta f| + C_{chi} - |\Delta C| \tag{23}$$

where $\Delta C$ is the total drift or amplitude aging effect from all causes at optical frequency $f = f_{chi}$, i.e.

$$\Delta C = C(f_{chi})_{t_2} - C(f_{chi})_{t_1} \tag{24}$$

If at time $t=t_2$, the controller resets the control signal amplitude back to its original value then $$\left\{\left|\frac{dC}{df}\right| |\Delta f| + C_{chi} - |\Delta C|\right\} = \{C_{chi}\} \tag{25}$$

And if $\Delta f$ remains within the frequency stability specification, this gives $$\frac{1}{C_{chi}}\left|\frac{dC}{d\lambda}\right| \geq \frac{1}{\lambda(\Delta f_s/f)} \frac{|\Delta C|}{C_{chi}} \tag{26}$$

Figure 8:
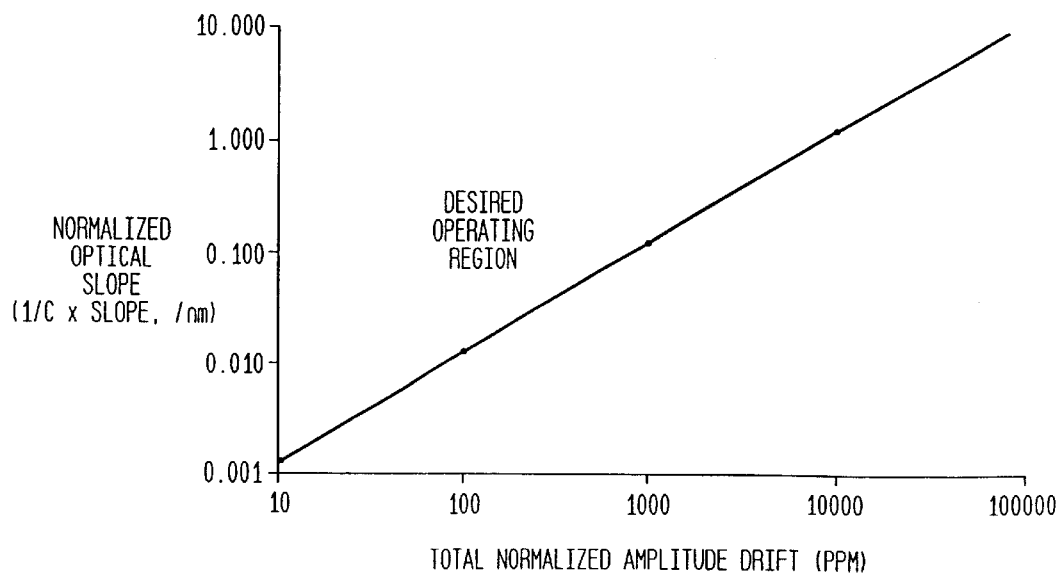
FIG. 8 is a graph depicting optical filter slope vs. total drift of the overall circuit of FIG. 3, assuming the required optical stability is 5 ppm.

Equation (26) is plotted in FIG. 8 where the required normalized optical filter selectivity is given in terms of the normalized total amplitude aging assuming the required frequency stability is 5 ppm and $\lambda = 1.55 \times 10^{-6}$ m. As stated earlier, noise was ignored and the entire frequency stability specification was assigned to aging which includes changes in the optical path, optical couplers, optical filters, optical detectors, and all electronics to the microcontroller. In practice the aging of components are unknown and will require measurement.

iv. RMS Method

Since the signal is digitized, various parameters associated with the signal can be calculated and although holding the DC amplitude constant has been implied, other control methods could be used such as calculating the RMS value and holding that constant.

Conclusion

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for stabilizing the wavelength of a laser source, the method comprising the steps of:

photo-coupling a first path from an output of a laser and passing said first path through an optical filter to derive a first optical signal, said first optical signal being a function of the frequency and the optical power of the output of the laser;

photo-coupling a second path from the output of the laser to derive a second optical signal, said second optical signal being a function of the optical power of the output of the laser independent of the frequency;

converting the optical signal from said first path and the optical signal from said second path to electrical signals;

converting the electrical signal from said first path and the electrical signal from said second path from analog to digital; and using a microcontroller to process said first path digital signal and said second path digital signal to determine frequency variations in the output of said laser, and develop a signal capable of adjusting the output of the laser.

2. The method of claim 1, wherein:

said microcontroller uses said second digital path to normalize said first digital path.

3. The method of claim 2, further comprising:

amplifying the electrical signals from said first and second paths.

4. The method of claim 2, further comprising:

converting the electrical signals from said first and second paths from current to voltage.

5. The method of claim 4, further comprising:

amplifying the electrical signals from said first and second paths.

6. The method of claim 1, further comprising:

converting the output of said microcontroller from digital to analog.

7. The method of claim 1, wherein said microcontroller is configured to run software code to process said first path digital signal and said second path digital signal to determine frequency variations in the output of said laser, and develop said signal capable of adjusting the output of the laser.

8. The method of claim 1, said step of using said microcontroller further comprises using said microcontroller to accommodate for the effect of component variations in said first and second paths.

9. The method of claim 1, said step of using said microcontroller further comprises using said microcontroller to compensate for the voltage levels of the electrical signals from said first and second paths.

10. The method of claim 7, further comprising:
updating said software code.

11. The method of claim 1, wherein said step of using a microcontroller comprises the steps of:
normalizing said first path digital with said second path digital signal;
integrating said normalized first path digital signal; and
developing said signal capable of adjusting the output of the laser, said signal based on said integrated normalized signal.

12. An apparatus for stabilizing the wavelength of a laser source, the apparatus comprising:
a laser source having an output;
first and second optical paths coupled from the output of the laser;
an optical filter positioned within the first optical path to produce a filter output signal having a power that is a function of the wavelength and power of the laser source;
a first photo-detector coupled to the output of the filter in the first optical path to detect said filter output signal;
a second photo-detector coupled to the second optical path to detect the power of the laser source independent of frequency;
first and second analog-to-digital converters attached to the output of the first and second photo-detectors, respectively; and
a microcontroller with inputs connected to the outputs of the first and second analog-to-digital converters, said microcontroller having means for processing data at the inputs to determine frequency variations in the output of the laser and generate a signal for controlling the laser responsive thereto.

13. The apparatus of claim 12, further comprising:
a first current-to-voltage converter electrically connected between the first photo-detector and the first analog-to-digital converter, and a second current-to-voltage converter electrically connected between the second photo-detector and the second analog-to-digital converter.

14. The apparatus of claim 13, further comprising:
a first amplifier electrically connected between the first current-to-voltage converter and the first analog-to-digital converter, and a second amplifier electrically connected between the second current-to-voltage converter and the second analog-to-digital converter.

15. The apparatus of claim 12, further comprising:
a first amplifier electrically connected between the first photo-detector and the first analog-to-digital converter, and a second amplifier electrically connected between the second photo-detector and the second analog-to-digital converter.

16. The apparatus of claim 15, further comprising:
a first current-to-voltage converter electrically connected between the first photo-detector and the first amplifier, and a second current-to-voltage converter electrically connected between the second photo-detector and the second amplifier.

17. The apparatus of claim 12, wherein:
said generated signal is converted from digital to analog by a digital-to-analog converter.

18. The apparatus of claim 12, said means for processing data comprising at least software code for use by said microcontroller.

19. The apparatus of claim 18, said microcontroller having a remote input for updating said software code.

20. A method for stabilizing the wavelength of a laser source, the method comprising the steps of:
photo-coupling a first path from an output of a laser and passing said first path through an optical filter to derive a first optical signal, said output having a frequency and an optical power;
photo-coupling a second path from the output of said laser to derive a second optical signal;
converting the optical signal from said first path and the optical signal from said second path to electrical signals;
converting the electrical signal from said first path and the electrical signals from said second path from analog to digital, said first path digital signal being a function of the frequency and the optical power of the output of the laser and said second path digital signal being a function of the optical power of the output of the laser independent of frequency;
normalizing said first path digital signal with said second path digital signal to derive a normalized signal, said normalized signal being a function of the frequency of the output of the laser;
integrating said normalized signal; and
developing a signal capable of adjusting the output of the laser, said signal based on said integrated normalized signal.

21. The method of claim 20, wherein said integrating step comprises the steps of:
selecting a period of time for integration; and
integrating said normalized signal over said period of time.

22. The method of claim 21, wherein said period of time is selected from a group consisting of hours, days, months, and years.

23. The method of claim 20, further comprising the step of: accommodating variations in said first path digital signal and said second path digital signal.

* * * * *